No. 880,454. PATENTED FEB. 25, 1908.
F. S. HOLLEY & J. C. WHITFORD.
COMBINED HEADER AND THRESHER.
APPLICATION FILED FEB. 17, 1903.

No. 880,454. PATENTED FEB. 25, 1908.
F. S. HOLLEY & J. C. WHITFORD.
COMBINED HEADER AND THRESHER.
APPLICATION FILED FEB. 17, 1903.

No. 880,454. PATENTED FEB. 25, 1908.
F. S. HOLLEY & J. C. WHITFORD.
COMBINED HEADER AND THRESHER.
APPLICATION FILED FEB. 17, 1903.

Witnesses.
Inventors.
F. S. Holley
J. C. Whitford
by A. H. Ste. Marie

UNITED STATES PATENT OFFICE.

FRANK S. HOLLEY AND JOHN C. WHITFORD, OF STOCKTON, CALIFORNIA, ASSIGNORS TO DANIEL BEST, OF SAN LEANDRO, CALIFORNIA.

COMBINED HEADER AND THRESHER.

No. 880,454.　　　　Specification of Letters Patent.　　　　Patented Feb. 25, 1908.

Application filed February 17, 1903. Serial No. 143,853.

*To all whom it may concern:*

Be it known that we, FRANK S. HOLLEY and JOHN C. WHITFORD, citizens of the United States, and residents of Stockton, in the county of San Joaquin and State of California, have invented a certain new and useful Improvement in Combined Headers and Threshers, of which the following is a specification.

This invention is an improvement in machines that cut, beat out, winnow, and sack grain in one continuous operation, and it particularly relates to the mechanism that combines and adjusts the grain-heading parts of such machines with and relatively to their grain-separating parts, so as to admit of the former being always disposed in parallelism with the lay of the ground, whether level or undulating, while the latter maintain at all times their normal or vertical aspect. The means heretofore provided to accomplish these essential adjustments generally necessitated the shifting of the driving-wheels with relation to the thresher frame or to the machinery to be actuated by each of the driving-wheels, which accordingly twisted or slackened or otherwise disarranged the interrelated power-transmitting devices, caused an irregular wear and strain, and in other respects injuriously affected the harmony and action of the parts. In our improvement both the thresher and header power-wheels or driving-wheels ever remain locally unchanged with relation each to its particular mechanism functionally.

The accompanying drawings, in which like reference characters indicate like parts in the several figures, are integral herewith as a medium of illustration.

In these drawings.

The principal parts of the machine, with which our invention is chiefly concerned, are: two driving-wheels, the left one of which is marked A and the right one B; a thresher supporting frame $A^2$ and thresher or separator $A^3$ thereon, the weight of which is for the greater part carried by the driving-wheel A; a supplemental frame $B^2$, auxiliary to the frame $A^2$ and in which supplemental frame the driving-wheel B is mounted; a front lead-wheel C, which serves to balance the thresher and steer the machine; an outer grain-wheel D, located some distance to the right of B and normally in line with it and A when on level ground; an A-shaped frame $D^2$, commonly known as the header A-frame, which frame $D^2$ is mounted at its apex on the wheel D, and at its base is supported by the auxiliary frame $B^2$; a sickle frame $D^3$, suspended in the usual manner from the A-frame $D^2$; a grain elevating spout E, hinged to the sickle frame $D^3$ and arranged to deliver the grain to the thresher through a feeder-house $A^4$; and means, hereinafter described, for flexibly connecting the auxiliary frame $B^2$ and header frame $D^2$ together, and each of them separately with the thresher frame $A^2$.

Figure 1:
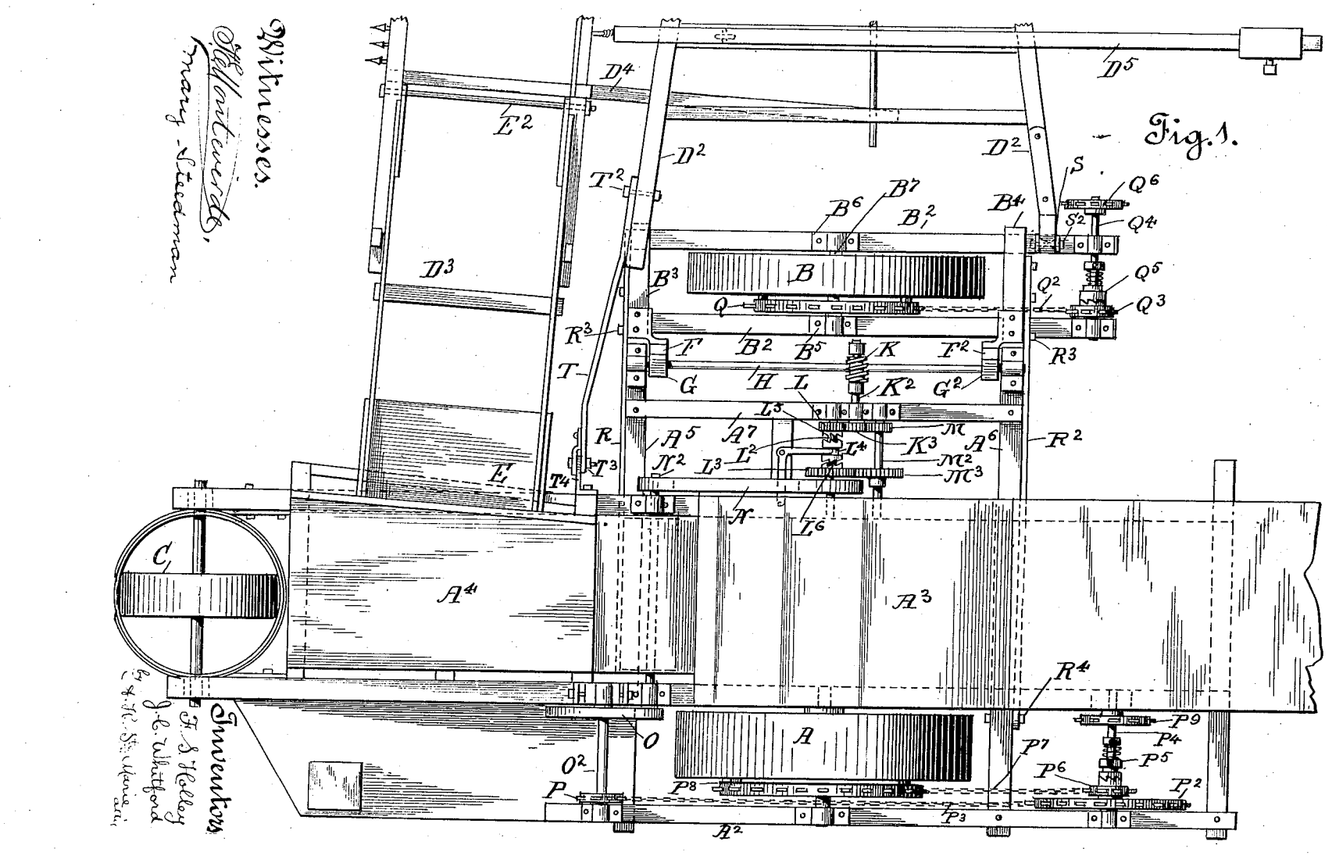
Figure 1 is a plan of one form of our improved machine, showing it in normal position on level ground.
Figures 2, 3:
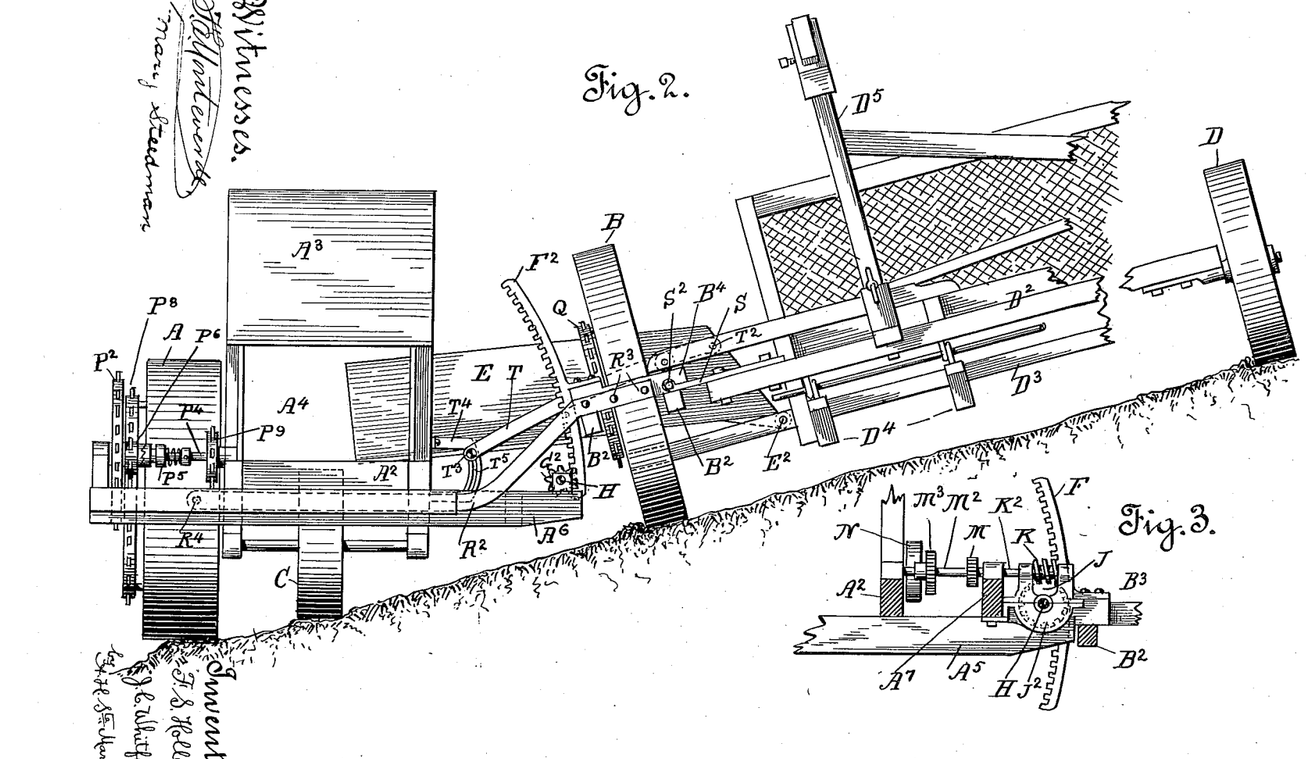
Fig. 2 is a rear elevation, showing the machine adjusted for heading and threshing grain on a regular slope, up hill.
Fig. 3 is a detail of the principal slant-adjusting mechanism embraced in the invention.

It will be seen at a glance, by referring particularly to Figs. 1 and 2, that in our improved machine the thresher driving-wheel A is fixedly mounted and axially journaled in the thresher or separator foundation frame $A^2$, or a rigid extension thereof, and therefore must always be vertically parallel and immovable with relation to the body of the separator $A^3$. On the other hand, the header driving-wheel B, which also is a thresher supporting associate of the wheel A and likewise immovable from its frame $B^2$, is parallel with the forementioned wheel A and the separator $A^3$ only when the ground is level. On all other conditions or lay of ground the wheel B and frame $B^2$ are rocked out of parallelism with the wheel A and separator $A^3$, by means of a vertically flexible and adjustable connection (to be explained later). It will also be observed that on regular slopes, but then only, this wheel B and its companion header-supporting wheel or grain-wheel D are parallel and both at right angles to the slant of the ground, that is, to the sickle-bar and its mounting frame $D^3$; and further that the grain elevating spout E acts freely, flexibly, and automatically with relation both to the grain bed or platform and the feed box of the thresher, with but little thrust, as will more clearly appear below. The aforesaid frame of the driving-wheel B comprises two parallel girders, marked $B^2 B^2$, and two end blocks, respectively designated $B^3$ and $B^4$. The girders $B^2 B^2$ are disposed horizontally and parallel with the direction of locomotion of the wheel B, and between and upon them the wheel B is mounted and fixedly journaled, by means of the boxing $B^5 B^6$ and the axle $B^7$. The blocks $B^3 B^4$ are secured to and at right angles across the said girders $B^2 B^2$, one to the front and the other to the rear of the wheel B. Owing to their position, these blocks appear in the plan, Fig. 1, as if they were continuations of transverse supporting beams $A^5 A^6$ of the separator, or slightly separated extensions thereof, but, in vertical aspect, the said blocks are on a line with the said beams only when on level ground, which will be better understood by viewing the flexible connection therebetween, illustrated by Fig. 2. We have also shown a flexible connection between the header A-frame $D^2$ and the right-hand girder $B^2$. These articulations of and with the frame of the wheel B and their means and functions will presently be explained.

We effect the positive flexing of the wheel frame $B^2$ and thresher frame $A^2$, to accommodate slanting bottoms, by means of a rack and pinion device and associate mechanism. Segment-racks $F F^2$, toothed on the concave side and flanged laterally and outwardly from the convex side, are secured in upright position, one each to the end blocks $B^3$ and $B^4$ of the frame of the wheel B, at the ends thereof that are adjacent to the inner ends of the separator frame beams $A^5 A^6$, respectively, the flange of each rack affording the means for bolting the same to its respective support. These racks $F F^2$ are engaged by pinions $G G^2$, which are carried by a reversible rotary shaft H, mounted longitudinally of the thresher and journaled upon and across the said inner ends of the beams $A^5$ and $A^6$. The arrangement is such that the shaft H is always parallel horizontally with the wheel B, and A and practically also with the wheel A, in their direction of locomotion, and the pinions $G G^2$ are always in mesh with the racks $F F^2$, G with F and $G^2$ with $F^2$, so that the rolling or revolving of the shaft H either way correspondingly actuates the said pinions and causes them to simultaneously move the said racks up or down, or, which amounts to the same, to travel together up or down these racks, thus changing the relative positions of the thresher frame $A^2$ and auxiliary frame $B^2$ and rocking the header and thresher parts of the combined machine out of line vertically. We thereby maintain the thresher properly upright while allowing the header to follow the lay of the ground, as seen in Figs. 2, 4, 5, and 6. And by providing two or more racks and pinions with a long interconnecting shaft as $F F^2$, $G G^2$, H, instead of a single rack and pinion or other simple gearing of which our invention admits, for tilting the frames $A^2$ and $B^2$ relatively one to the other, we divide and proportionately lessen the strain between each rack and its pinion, and we further maintain these frames in correct relation to each other longitudinally, so there can be no twisting or swaying thereof such as would impair the efficiency of the mechanical equipment of either part of the machine. The tilting of the frames $A^2$ and $B^2$ relative to each other is further accomplished with greater ease by the rack and pinion construction or other flexing mechanism by arranging and distributing the weight of the thresher $A^3$ and its auxiliary mechanism on the thresher frame $A^2$ so that the greater part of its weight is carried by its supporting wheel A. This likewise increasing its tractive power to be better utilized in the operation of the thresher and furthermore, a more important feature, it decreases the weight of the thresher resting on the auxiliary supporting frame $B^2$ through the rack and pinion connection and reduces the amount of power required in elevating or depressing the flexibly connected side of the thresher frame and a quicker response is insured when the power is thrown on, for operating the flexing mechanism.

To actuate the shaft H, pinions $G G^2$, and racks $F F^2$, we employ the worm-gearing illustrated in Figs. 1 and 3, which consists, as usual, of a worm-wheel J and worm K. The worm-wheel J is secured somewhat centrally on the shaft H, and the worm K is placed horizontally above them. This worm is a threaded portion of a short transverse shaft $K^2$, which is journaled by its end that is towards the separator $A^3$ upon a girder $A^7$, which girder is secured to and across the top of the transverse beams $A^5 A^6$, parallel to the side of the separator frame $A^2$. At this end the shaft $K^2$ is made to carry a fixed pinion $K^3$, by means of which it can be revolved in either direction, and its middle portion and other end are further supported and journaled, on opposite sides of the worm K, in the cap of a bearing $J^2$, that practically incases the worm-wheel J and is securely fastened to the girder $A^7$, on the right thereof, as represented in Fig. 3. The bearing $J^2$, it will be observed, is designed to supply the worm-gearing with lubricant and to protect it more or less from sand and dust.

Upon opposite sides of the forenamed pinion $K^3$ of the worm-shaft $K^2$, and in mesh therewith, we mount other pinions L M, each upon a separate arbor, $L^2$, $M^2$,—L upon $L^2$ and M upon $M^2$. Like the worm-shaft $K^2$, the arbors $L^2 M^2$ are disposed horizontally and at right angles to the side of the separator. They are journaled at one end to an adjacent side timber of the separator frame $A^2$ and at the other end to the aforementioned girder $A^7$. We also mount a gear, $L^3$, $M^3$, towards the end of each arbor, $L^2$, $M^2$, which is against the separator, $L^3$ upon $L^2$ and $M^3$ upon $M^2$, in such a way that these gears shall be in mesh with each other. The pinion M and gear $M^3$ are keyed fast to their arbor $M^2$, while the pinion L and gear $L^3$ are free to revolve upon their arbor $L^2$ subject to be actuated by a revolving or transmission clutch $L^4$, which latter is axially fixed upon the arbor $L^2$, though free to be slid longitudinally thereon to admit of its being shifted to and from counter clutches $L^5$ $L^6$, which are integral with the pinion L and gear $L^3$ respectively. Either the pinion L or the gear $L^3$ can thus be clutched and the pinion $K^3$ thereby revolved directly or indirectly in one direction or the other, at the will of the operator, according as it is required to turn the worm-gearing either forward or rearward, or, which is the same thing, according as it is required to accommodate the combined machine to an ascending or a descending slant, or to varying slants. This clutching device, being already known, will not be specifically claimed herein and needs no further description. The arbor $L^2$ is the power shaft to the mechanism just described; the arbor $M^2$ is but incidently supplemental. As the machine is being drawn or propelled over the ground, the said arbor $L^2$ is kept continuously running by means of belt-gearing N from the cylinder-shaft, $N^2$, as indicated in Fig. 1. This is our preferred arrangement, although motion may be imparted to the arbor $L^2$ in various other ways.

As further shown in Fig. 1, the before-mentioned cylinder-shaft $N^2$ is driven by a pinion and internal gear device O, from a countershaft $O^2$ (known as the jack-shaft), which is located transversely of the frame $A^2$, forward and to the left of the separator $A^3$, and itself receives its motion through sprocket-wheels P $P^2$, and a chain $P^3$, from a similarly disposed countershaft $P^4$ on the rear of the said frame $A^2$. The last named shaft has a spring-pressed clutch $P^5$ feathered on it and also carries a loose sprocket-wheel $P^6$ adapted to be engaged thereby, which loose sprocket-wheel is connected by a chain $P^7$ with another sprocket-wheel $P^8$ that is bolted to the spokes of the driving-wheel A, so that the said loose sprocket-wheel will always be revolving when the machine moves, but the said shaft $P^4$ will run only when allowed to be in clutch therewith. The same shaft $P^4$ carries a fixed sprocket-wheel $P^9$, which shares its intermittent motion and rest and is utilized to drive the machinery of the thresher, through a suitable chain and other gears (not shown). The driving-wheel A, it will now be seen, furnishes the power both to operate the thresher machinery and to flex the connection between the thresher frame $A^2$ and the supplemental frame $B^2$, that is, to tilt one of these frames with relation to the other as needed, through the gearing and allied instrumentalities so far mentioned.

Power to actuate the header machinery is derived from the driving-wheel B, and is transmitted by a sprocket-wheel Q bolted to the spokes thereof and connecting by a chain $Q^2$ with a loose sprocket-wheel $Q^3$, which latter is mounted on a shaft $Q^4$, having a spring-pressed slidable clutch $Q^5$ on it and also carrying a fixed sprocket-wheel $Q^6$,— these gears being and operating substantially the same as those provided for the thresher machinery and just described, save that they are borne entirely by the said wheel B and its frame.

In order to retain the thresher frame $A^2$ and wheel frame $B^2$ positively in vertical hinge connection, we provide two long tie-bars R $R^2$, which are steel bars securely fastened at one end of each, to and along the end blocks $B^3$ $B^4$ of the wheel frame, opposite the driving-wheel B, by bolts $R^3$; and, at their other ends, the said tie-bars are pivoted to the corresponding cross beams $A^5$ $A^6$ of the thresher frame, about opposite the driving-wheel A, by pivots $R^4$. The strong bolting of the bars R $R^2$ to the ends of the frame $B^2$, it will be seen, always maintains the wheel B fixed as a tangent to an imaginary movable arc of which the center is on a line joining the said pivots $R^4$. The distance between these pivots and the segment-racks F $F^2$, is in each case the radius of the hinge relation of the frames $A^2$ and $B^2$ and determines the curvature and direction of each rack. It is now clear that, this radius being quite long and the rack approximately straight and upright, and the grain elevating spout E being hinged to the sickle frame $D^3$ of the header, which is tilted coincidently with the wheel frame $B^2$ and its wheel B, the influence of flexion upon the thrust of the said spout will be but slight. As shown, the bars R $R^2$ pass below the thresher and are bent so that they may not come in contact with the bottom of the thresher frame on upwardly-trending inclines.

As before stated, the header frame $D^2$ also is flexibly connected, at its base, to the auxiliary frame $B^2$, by a loose hinge or pivot S, hereafter more particularly described. The frame $D^2$ is attached rearwardly, as shown, by one end of its rear member to the upper side of the right girder of the frame $B^2$, by the hinge or pivot S, and forwardly the corresponding end of its front member loosely rests upon the forward end of the same girder and upon the head block $B^3$. This flexible connection is provided in order to permit an independent movement of the header relatively to its auxiliary supporting frame B² when meeting sudden irregularities in the field, such as irregular depressions and other similar conditions of surface. The connection, it will be observed, in no way interferes with the rocking of the auxiliary frame B² on the pivots of its tie-bars R R², about the thresher frame A², and allows the header A-frame D² and thereto attached sickle frame D³ to remain practically in exact parallelism with the surface of the ground at all times and thus always accommodate the sickle-bar to the trend of the ground, as is readily inferred from the several figures of the drawings. The latter named frame (D³) is held up as usual, in its position in front of the frame D², by a suitable number of arms D⁴ which are pivoted or hinged to the under side of D², and by a weighted lever D⁵ fulcrumed on the upper side of D².

The spout E is hinged at its lower end to the frame D³ by means of a hinge rod E² while its upper end rests upon the sill of and discharges the headed grain into the feeder-house A⁴, in a manner that is well known. Now, it is understood that when the header is tilted or thrown into an inclined position relatively to the thresher, which latter must always be kept in a vertical position, the said upper end of the spout would be moved in or out of the feeder-house, according as the header may be inclined upward or downward, if means were not taken to prevent it. We have found that by loosely hinging the header, through its A-frame D², to the supplemental frame B² at one point and loosely mounting it thereon at another point, as hereinbefore described, and then providing a suitable connection between the loosely mounted portion of the said A-frame and the adjacent side of the thresher, the header and its connected spout E can be swung or forced back the proper distance on the loose hinge when tilted toward the thresher, and likewise swung or drawn in when inclined the opposite way. So that, when the header is inclined upwardly, the said connection of the A-frame with the thresher will operate to push away the header and spout and thereby overcome the tendency of the latter being thrust too far into the feeder-house, and, on the other hand, when the header is inclined downward, the same connection will act so as to draw the header and spout forward and thus overcome the tendency of the spout then to be pulled out of the feeder-house. We accomplish this by flexibly connecting the A-frame rearwardly with the frame of the wheel B through the medium of the loose hinge or pivot before mentioned and marked S, and by attaching the said A-frame forwardly to the thresher frame A² through the instrumentality of a draw-bar T, which is pivotally secured at one end to the aforesaid loose portion of the A-frame as at T² and is also pivotally connected at the other end to the side of the said thresher frame by a bolt T³ engaging a bracket T⁴. This bracket is preferably slotted vertically so that the bolt or pivot T³ of the thereto connected draw-bar can move freely from the top to the bottom of the slot thereof, which slot is designated T⁵ and is preferably curved so that its ends will approach the side of the thresher and thereby facilitate the movement of the pivot of the draw-bar and add to the effectiveness of the machine.

Figure 4:
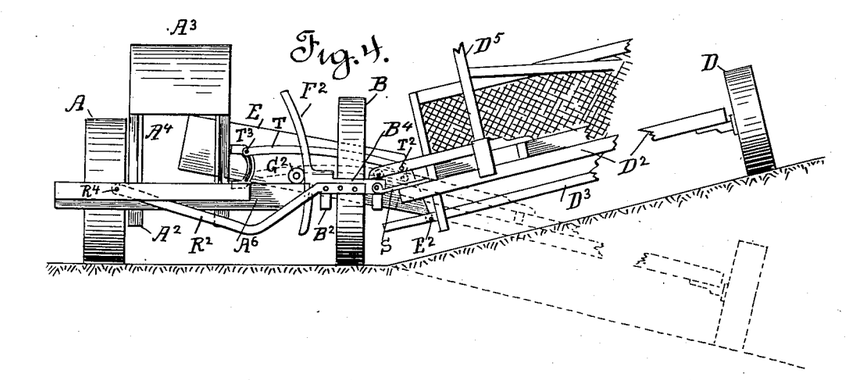
Figs. 4, 5, and 6 are diagrammatic views, illustrating various adjustments of the header and thresher for work on irregular surfaces and also down hill. Portions of the machine that are irrelevant, it will be understood, have been broken away or altogether omitted from each one of these figures.
Figure 5:
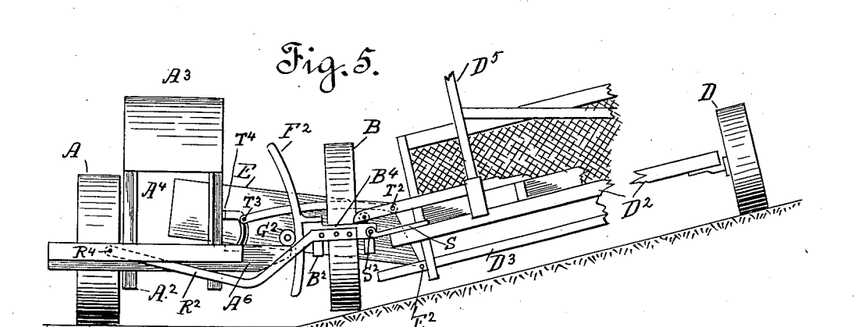
Figure 6:
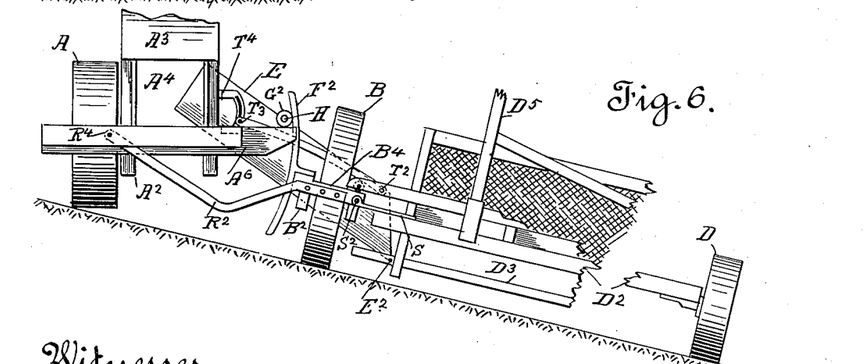

It will be seen that when the wheel D is above the level, the pivot T³ will occupy the upper portion of the slot as shown in Figs. 2, 4, and 5, and when D is below the level, T³ will occupy the lower portion of the slot, as indicated in Fig. 6 (and also by dotted lines in Fig. 4), but in either position, as well as in the normal or level position in which the pivot will stand at or about the middle, the movement or change will be automatic. In this manner the end of the spout is automatically held at all times in substantially the same position relatively to the feeder-house, regardless of the flexing of the two parts of the machine. The knuckle of the hinge S is belled out, as indicated by dotted lines in Fig. 1, to give it sufficient play on its pin or bolt S² to prevent the forward and backward movement of the outer end of the header from binding the same, and thereby causing the parts to break or move with great friction, when the header and thresher are flexed relatively to each other and the draw-bar pushes or pulls on the A-frame and swings it on the hinge S to maintain the spout in proper position, as above described.

While we have shown what we consider the most desirable form and means of constructing our machine, it is evident that changes and variations may be made in its different parts, and therefore we reserve the right to make such changes and alterations in the same as will come within the scope of our invention.

What we claim, and desire to secure by Letters Patent of the United States, is:

1. A machine of the character described comprising a thresher, a wheel carrying most of the weight thereof, an auxiliary and inclinable support located adjacent to said thresher and having means to sustain part of the weight of said thresher, a header having an outer fixed support and a pivoted connection to said inclinable support, means for flexibly connecting the thresher to said auxiliary and inclinable support, and means for holding the thresher in a vertical position while the auxiliary and inclinable support and header may be adjusted to the trend of the ground.

2. A machine of the character described comprising a header, a thresher, an auxiliary and inclinable support between said header and thresher and having a separate and independent carrying means, and means for properly and flexibly holding the inner end of the header and the adjacent end of the thresher on said auxiliary support.

3. A machine of the character described comprising a header, a thresher frame, an auxiliary and intermediate support having an independent carrying wheel or support, means for flexibly connecting said intermediate support, with both the header and thresher frame, and means for elevating or depressing the inner side of said thresher frame.

4. A machine of the character described comprising a thresher, a header, an auxiliary and intermediate frame for supporting both the thresher and the header and having an independent carrying wheel or support, and flexible connections joining the thresher and the header each with said support and separately with each other.

5. A machine of the character described comprising a header, a thresher, an auxiliary and intermediate support between and flexibly connected to the said header and thresher, said thresher and intermediate support each having an independent supporting or carrying means which operate independently and respectively the mechanism of the thresher and header.

6. A machine of the character described comprising a header, a thresher, an auxiliary and intermediate support between and flexibly connected to said header and thresher, said thresher and intermediate support having independent supporting or carrying means which operate independently and respectively the mechanism of the thresher and header, and means for adjusting the flexible connections between said intermediate support and thresher, whereby the thresher will be supported in a substantially vertical position and the header adjusted to the trend of the ground.

7. A machine of the character described comprising a header, a thresher, an auxiliary and intermediate support between and flexibly connected to said header and thresher, said thresher and intermediate support having independent supporting or carrying means which operate independently and respectively the mechanism of the thresher and header, and means for adjusting the flexible connections between the said auxiliary support and thresher by being thrown into engagement with the operating mechanism of the thresher.

8. A machine of the character described comprising a header, a thresher, means for supporting the header at its outer end and the thresher at a point opposite, an intermediate auxiliary support having an independent carrying means, and means for flexibly connecting said support to the side of the thresher remote from it.

9. A machine of the class described comprising a header, a thresher, means for supporting the thresher at a point laterally to the line of draft and the header at its outer end, an intermediate wheeled support auxiliary to both the header and the thresher, and means for flexibly connecting the header and the thresher each with said auxiliary support.

10. A machine of the class described comprising a header, a thresher, means for supporting the thresher at a point laterally to the line of draft, means for supporting the header at its outer end, an auxiliary support intermediate of said supporting means of the header and thresher, flexible connections joining the header and the thresher to opposite sides of said auxiliary support, and means for moving the auxiliary support in the arc of a circle relatively to the thresher.

11. A machine of the class described comprising a header, a thresher, an auxiliary frame between said header and thresher and flexibly connected thereto, means for supporting the said header, thresher and frame at three points in a vertical plane substantially at right angles to the line of draft, all three supports being in alinement on level ground, but movable vertically out of said alinement on irregular surfaces.

12. A machine of the class described comprising a header, a thresher, three wheels arranged substantially in axial alinement, two of which are movable vertically with relation to the other one, said other wheel and one of the two movable wheels being driving-wheels, and means for positively moving the middle driving-wheel vertically in the arc of a circle relatively to the other driving-wheel.

13. A machine of the character described comprising a header frame, a thresher frame, an auxiliary supporting frame interposed between and flexibly connected to each of the header and thresher frames and a supporting or carrying wheel for each of the three flexibly connected frames.

14. A machine of the character described comprising a header frame, a thresher frame, an auxiliary supporting frame interposed between and flexibly connected to each of the header and thresher frames, said header and thresher frames having an independent flexible connection with each other, and a supporting or carrying wheel for each of the three flexibly connected frames.

15. A machine of the class described comprising a header frame, a thresher frame, an auxiliary frame interposed between and flexibly connected to each of the header and thresher frames, said auxiliary and thresher frames having independent supporting or carrying wheels, the wheel of said auxiliary frame operating the mechanism of the header and that of the thresher its own mechanism.

16. A machine of the character described comprising a header frame, a thresher frame, an auxiliary supporting frame interposed between and flexibly connected to each of the header and thresher frames, a flexing mechanism connected to the auxiliary supporting and thresher frames, a supporting or carrying wheel for each of the three flexibly connected frames and means for connecting the movement of the supporting or carrying wheel of the thresher frame to the said flexing mechanism.

17. A machine of the character described comprising a header frame, a thresher frame, an auxiliary supporting frame interposed between and flexibly connected to each of the header and thresher frames, a flexing mechanism connected to the auxiliary supporting and thresher frames at two points with separate operating mechanisms, a supporting or carrying wheel for each of the three flexibly connected frames, and means for connecting the movement of the supporting or carrying wheel of the thresher frame to the operating mechanism of said flexing mechanism.

18. A machine of the character described comprising a header frame, a thresher frame, an auxiliary supporting frame interposed between and flexibly connected to each of the header and thresher frames, a flexing mechanism connected to the auxiliary supporting and thresher frames at two points with separate operating mechanisms, a supporting or carrying wheel for each of the three flexibly connected frames, means for connecting the movement of the supporting or carrying wheel of the thresher frame to the operating mechanism of said flexing mechanism, and means for simultaneously applying equal power to the two separated operating mechanisms to flex said header and auxiliary supporting frames.

19. A machine of the character described comprising a header frame, a thresher frame, an auxiliary supporting frame interposed between the header and thresher frames and flexibly connected to the thresher frame, one of the said auxiliary supporting or thresher frames being provided with two pinions and the other one with two racks in mesh therewith, and means for simultaneously applying power to said pinions to rotate them in either direction.

20. A machine of the character described comprising a header frame, a thresher frame, an auxiliary supporting frame interposed between said header and thresher frames and flexibly connected to the thresher frame, one of the said auxiliary supporting or thresher frames being provided with a shaft journaled parallel with the line of draft and the other one of said frames having a rack near each end of the shaft, a pinion attached to each end of the shaft and in engagement with the adjacent rack and means for applying power to the intermediate portion of the shaft to rotate it in either direction.

21. A machine of the character described comprising a header frame, a thresher frame, an auxiliary supporting frame interposed between said header and thresher frames and flexibly connected to the thresher frame, one of the said auxiliary supporting or thresher frames being provided with pinions fixed to a rotary shaft having bearings at its ends and the other with curved racks engaged by the pinions, a worm gear for rotating the shaft and pinions in either direction, and a combined lubricating box and dust guard surrounding the said worm gear and forming a bearing for the shaft of said worm gear and pinions.

22. A machine of the character described comprising a header frame, a thresher frame, an auxiliary supporting frame interposed between and flexibly connected to each of the header and thresher frames, a flexing mechanism connected to the auxiliary supporting and thresher frames, consisting of a rotary shaft on one of the flexibly connected auxiliary or thresher frames, said shaft provided with a pinion at one end and a worm at the other, a rack on the other of the flexibly connected frames, means for engaging with said rack and said worm respectively, and reversible driving means for engaging said pinion.

23. A machine of the character described comprising a header frame, a thresher frame, an auxiliary supporting frame interposed between and flexibly connected to each of the header and thresher frames, the thresher frame having a shaft journaled parallel with the line of draft and having a fixed pinion at each end thereof, said auxiliary supporting frame having two vertical and curved racks attached thereto and in engagement with the pinions of the thresher frame and means for applying power to the journaled shaft to rotate the same in either direction.

24. A machine of the class described comprising a header frame, a thresher frame, an auxiliary supporting frame interposed between and flexibly connected to the header and thresher frames, means for flexing said auxiliary and thresher frames, worm gearing for operating said flexing means and provided with a pinion, two shafts journaled upon odposite sides of said pinion, each of which is provided with two gear wheels, two of said wheels intermeshing and the other two engaging with said pinion, the wheels on one of said shafts being loosely mounted and each provided with a clutch member, and a laterally movable double clutch mounted on said shaft to rotate therewith in position to run free from either of said loose wheels or to be thrown into engagement with either one of them.

25. A machine of the class described comprising a header frame, a thresher frame, an auxiliary supporting frame interposed between and flexibly connected to the header and thresher frames, means for flexing said frames of the auxiliary support and thresher, said means being provided with reversing mechanism, a thresher provided with a rotary cylinder and supported on the thresher frame, and means for connecting the cylinder of the thresher with the reversing mechanism and thereby operating the flexing means.

26. A machine of the class described comprising a header frame, a thresher frame, an auxiliary supporting frame interposed between and flexibly connected to the header and thresher frames, each of the auxiliary supporting and thresher frames provided with a supporting wheel, and means for holding one of said wheels at all times in a plane at a tangent to a circle whose center is the pivotal point between said auxiliary and thresher frames.

27. A machine of the class described comprising a header frame, a thresher frame, an auxiliary supporting frame interposed between and flexibly connected to the header and thresher frames, each of said auxiliary supporting and thresher frames provided with a supporting wheel and one of them being provided with segmental racks, each rack being at a distance from the pivoted point between the auxiliary and thresher frames equal to the radius of the circle of which it forms an arc, and pinions for engaging with said rack on the other frame and flexing the frames.

28. A machine of the class described comprising a header frame, an auxiliary frame, a thresher frame, said auxiliary frame being provided with two bars rigidly secured thereto at one end and pivotally secured to the thresher frame at the other end, segmental racks on said auxiliary frame, each at a distance from the pivotal point of one of said bars equal to the radius of the circle of which the rack forms an arc, and pinions for engaging with said racks.

29. A machine of the class described comprising a header frame, a thresher frame, an auxiliary supporting frame interposed between and flexibly connected with the header and thresher frames, the auxiliary supporting and thresher frames provided each with a supporting wheel and one of said frames having two bent bars rigidly secured thereto at one end and pivotally secured at the other end to the other frame in front and rear of its wheel respectively, and means for positively flexing said frames.

30. In a combined header and thresher, a thresher frame, an auxiliary frame flexibly connected therewith, means for moving said auxiliary frame vertically with relation to the thresher frame, a header frame, and means for pivotally connecting one portion of the header frame to the auxiliary frame and another portion to the thresher frame.

31. In a combined header and thresher, a thresher frame, an auxiliary frame therefor, means for flexing said frames relatively to each other, a header frame flexibly connected with said auxiliary frame at the rear and loosely mounted thereon in front, and means for pivotally connecting the header frame with the thresher frame adjacent to said loose mounting.

32. In a combined header and thresher, a thresher frame and auxiliary frame therefor flexibly connected with each other, means for positively flexing said frames, a header frame pivotally secured to said auxiliary frame at one point and loosely mounted thereon at another point, a bracket on the thresher frame, and a draw-bar pivotally secured at one end to the header frame adjacent to its loose mounting and also pivotally connected with said bracket at the other end.

33. A thresher and a header flexibly connected with each other rearwardly, the thresher being provided with a feed box at a suitable point forward and the header with a delivery spout extending into said box, means for tilting the two parts of the machine relatively one to the other, and hitching means acting to pull or push the spout to or away from the feed box according to the way said parts are tilted.

34. A machine of the character described comprising a header, a thresher frame having a support, an auxiliary frame interposed between the header and thresher frame and having an independent carrying wheel, the auxiliary frame supporting both the header and thresher frame, and a flexible connection between said thresher frame and auxiliary frame.

35. A machine of the character described comprising a header having an outer supporting wheel, a thresher frame having a supporting wheel, an auxiliary frame interposed between the header and thresher frame and having an independent carrying wheel, the auxiliary frame carrying wheel supporting both the header and thresher frame, and a flexible connection between said thresher frame and auxiliary frame.

36. A machine of the character described comprising a header, a thresher frame having a supporting wheel carrying most of the weight of the thresher mechanism, an auxiliary frame interposed between the header and thresher frame and having an independent carrying wheel, the auxiliary frame carrying wheel partially supporting the header and the thresher, a flexible connection between the auxiliary and thresher frames and means for varying said flexible connection.

37. A machine of the character described comprising a header, a thresher frame having a supporting wheel carrying most of the weight of the thresher mechanism, an auxiliary frame interposed between the header and thresher frame and having an independent carrying wheel, the auxiliary frame carrying wheel partially supporting the header and the weight of the thresher mechanism, a flexible connection between the auxiliary and thresher frames, means for varying the flexible connection, and means for connecting the movement of the thresher frame supporting wheel to the said varying means.

FRANK S. HOLLEY. [L. S.]
JOHN C. WHITFORD. [L. S.]

Witnesses:
E. B. STOWE,
NONIE BURKE.